(12) United States Patent
Lang et al.

(10) Patent No.: US 9,598,111 B2
(45) Date of Patent: Mar. 21, 2017

(54) MICROTRUSS REPLACING STRUCTURAL FOAM IN BODY STRUCTURAL APPLICATION

(71) Applicant: GM GLOBAL TECHNOLOGY OPERATIONS LLC, Detroit, MI (US)

(72) Inventors: Steven C. Lang, Columbus, MI (US); Nilesh D. Mankame, Ann Arbor, MI (US); Joseph M. Polewarczyk, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 75 days.

(21) Appl. No.: 14/473,647

(22) Filed: Aug. 29, 2014

(65) Prior Publication Data

US 2016/0059897 A1    Mar. 3, 2016

(51) Int. Cl.
*B62D 25/02* (2006.01)
*B62D 29/00* (2006.01)

(52) U.S. Cl.
CPC ......... *B62D 25/025* (2013.01); *B62D 29/001* (2013.01)

(58) Field of Classification Search
CPC .. B62D 25/025; B62D 29/001; B62D 29/005; B62D 29/002
USPC ............................................ 296/209, 187.12
See application file for complete search history.

(56) References Cited

U.S. PATENT DOCUMENTS

| | | | |
|---|---|---|---|
| 4,387,920 A | 6/1983 | Slaughter et al. | |
| 4,504,534 A | 3/1985 | Adachi et al. | |
| 4,978,562 A | 12/1990 | Wycech | |
| 5,385,375 A | 1/1995 | Morgan et al. | |
| 5,804,511 A | 9/1998 | Kelman et al. | |
| 7,382,959 B1 | 6/2008 | Jacobsen | |
| 7,424,967 B2 * | 9/2008 | Ervin et al. | 228/193 |
| 7,653,279 B1 | 1/2010 | Jacobsen | |
| 7,819,462 B1 | 10/2010 | Owens | |
| 2008/0048462 A1 | 2/2008 | Zabik | |
| 2012/0153669 A1 * | 6/2012 | Nagwanshi et al. | 296/187.08 |
| 2013/0038076 A1 | 2/2013 | Benvenuto et al. | |
| 2014/0084633 A1 * | 3/2014 | Matsuda et al. | 296/203.01 |

(Continued)

FOREIGN PATENT DOCUMENTS

EP    1 300 293 A1    4/2003

OTHER PUBLICATIONS

Eldridge, David. "DuPont shows auto composite impact beam at K preview" Plastics News, European Plastics News, Jun. 14, 2013.

(Continued)

*Primary Examiner* — Jason S Morrow
(74) *Attorney, Agent, or Firm* — John A. Miller; Miller IP Group, PLC

(57) ABSTRACT

A vehicle structural member, such as a rocker panel, including a micro-truss core. The structural member includes specially configured and opposing outer panels that are welded together to define a channel therein, where the micro-truss core is placed in one of the panels or is fabricated to one of the panels during the micro-truss fabrication process before the panels are secured together. The micro-truss core can include separate individual sections, where each section has a tailored stiffness for that location in the member, or the micro-truss core can be a continuous core, where different sections along the length of the core are fabricated with different stiffnesses.

16 Claims, 3 Drawing Sheets

(56) References Cited

U.S. PATENT DOCUMENTS

2014/0252674 A1\* 9/2014 Hundley et al. .............. 264/221
2014/0265443 A1\* 9/2014 Meaige et al. ........... 296/187.02
2014/0272275 A1\* 9/2014 Yang et al. ................... 428/116
2015/0111979 A1\* 4/2015 Yang et al. ..................... 522/15

OTHER PUBLICATIONS

Strand, M. et al. "Non-Conventional Technologies for the Manufacturing of Anti-Intrusion Bars" 4 pgs.

\* cited by examiner

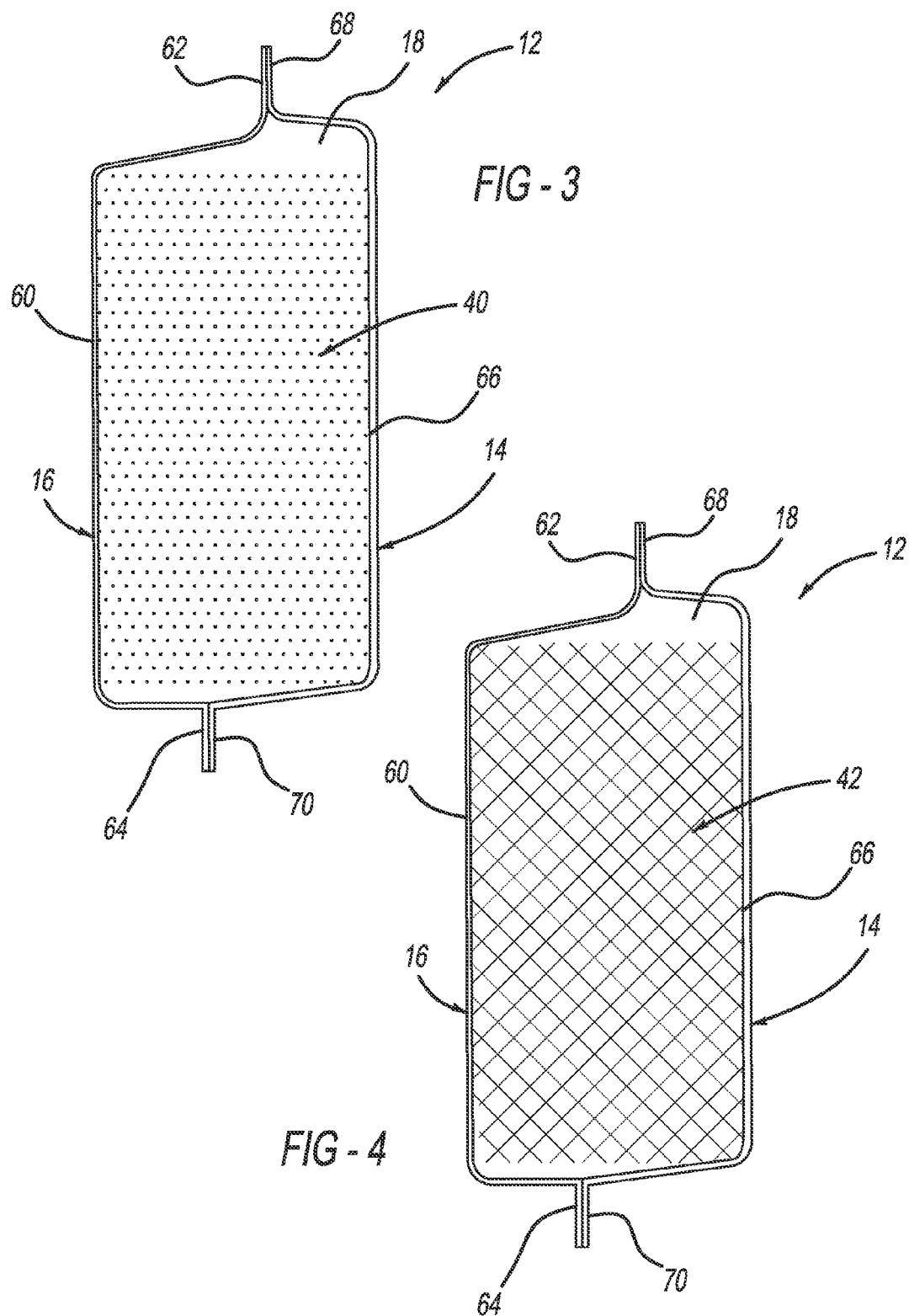

MICROTRUSS REPLACING STRUCTURAL FOAM IN BODY STRUCTURAL APPLICATION

BACKGROUND OF THE INVENTION

Field of the Invention

This invention relates generally to a vehicle structural member that includes a micro-truss reinforcement core and, more particularly, to a vehicle rocker panel that includes a micro-truss reinforcement core extending along the length of the rocker panel, where the core includes sections having varying densities so as to match the stiffness requirements of the panel at different locations with minimal mass.

Discussion of the Related Art

Modern vehicles are equipped with a number of impact beams and structural members providing structural integrity against collisions and impacts with objects, such as other vehicles. More particularly, impact beams are traditionally used in vehicle designs to protect occupants from front, side and/or rear impacts by absorbing energy through deformation in the event of a vehicle crash and distributing the applied dynamic loads to other energy absorbing sub-systems on the vehicle. For example, it is known to provide impact beams in a front energy management or bumper assembly, a rear energy management or bumper assembly and side impact beam assemblies on a vehicle. Vehicles also typically include rocker panels that extend along the bottom side edge of the vehicle. These rocker panels are typically rectangular steel tubes including spaced apart reinforcing walls or inserts that have a thickness and spacing depending on the stiffness and impact requirements for a particular location on the vehicle, where an increase in the thickness and number of the reinforcing walls increases the weight of the vehicle.

Impact beams at the front and rear of the vehicle are usually referred to as bumper beams, and impact beams on the sides of the vehicle are sometimes referred to as anti-intrusion bars. In all cases, it is desirable to provide an impact beam with low mass, high flexural stiffness and strength, and high energy absorption per unit mass. The lightweight requirement is predicated by fuel economy standards and the fact that impact beams are located both very close to and very far from the vehicle's center of mass. Maximizing the flexural stiffness and strength is necessary if the beam is to survive low speed impacts without damage and transfer impact loads throughout the duration of a high speed impact event. Further, a high level of energy absorption translates into reduced load transfer to the occupants of the vehicle, thus increasing safety.

It is known in the art to provide vehicle impact beams and structural members having sandwich structures. These prior art impact beams can generally be categorized into three designs, namely, hollow beams that are fully or partially reinforced with a polymer or metallic foam, single or dual-sided facesheets reinforced with a honeycomb-like cellular core, and formed composite impact beams. For hollow metallic or polymer matrix composite tube structures which are fully or partially reinforced with a lightweight foam core, the material used for the core can be either a metallic or polymeric foam that is bonded, mechanically attached or interference fit into the tube structure. The purpose of the core is to carry shear loads in the sandwich structures and absorb energy in the event of a low or high speed impact, which is a distinction dependent on the density and composition of the foam. The use of honeycomb or honeycomb-like ordered cellular cores to provide reinforcement to one or two flat facesheets have an open-sided sandwich designs and have honeycomb, discrete-stiffened or wine-crate structures extending from the front face of the impact beam back towards the passenger compartment of the vehicle. If a second facesheet is not included between the core and the passenger compartment, then the core material must be relatively dense since it provides most of the flexural stiffness to the structure adjacent to the shear load transfer.

For continuous or discontinuous fiber reinforced polymer matrix composite impact beams, the matrix material may either be a thermoplastic or thermosetting polymer introduced via resin transfer molding, compression molding, blow molding, or other similar fabrication processes.

It is also known in the art to fabricate a three-dimensional network of photopolymer waveguides comprising a unitary truss or lattice architecture, hereafter referred generally as a micro-truss structure or micro-truss core. For example, U.S. Pat. Nos. 7,653,279 and 7,382,959 disclose a process for fabricating such a micro-truss structure. Generally, the process includes providing a reservoir or mold filled with a volume of a curable monomer and covered by a mask including strategically positioned apertures. UV light sources are positioned relative to the mask and exposure to collimated UV light through the mask apertures forms a series of interconnected self-propagating photopolymer waveguides, referred to herein as struts, to form the truss or lattice architecture. Once the photopolymer waveguides are formed, the reservoir is emptied of the unpolymerized monomer which was not exposed to UV light. The micro-truss structure may then undergo a post-cure operation to increase the cross-link density in the photopolymer waveguides. This post-cure may be accomplished via a thermal cure, an additional exposure to UV light, an equivalent method or combinations thereof.

SUMMARY OF THE INVENTION

The present disclosure describes a vehicle structural member, such as a rocker panel, including a micro-truss core. The structural member includes specially configured and opposing outer panels that are welded together to define a channel therein, where the micro-truss core is placed in one of the panels or is fabricated to one of the panels during the micro-truss fabrication process before the panels are secured together. The micro-truss core can include separate individual sections, where each section has a tailored stiffness for that location in the member, or the micro-truss core can be a continuous core, where different sections along the length of the core are fabricated with different stiffnesses.

Additional features of the present invention will become apparent from the following description and appended claims, taken in conjunction with the accompanying drawings.

BRIEF DESCRIPTION OF THE DRAWINGS

FIG. 3 is a cross-sectional view of the rocker panel at one location;

FIG. 4 is a cross-sectional view of the rocker panel at a different location;

DETAILED DESCRIPTION OF THE EMBODIMENTS

Figure 1:
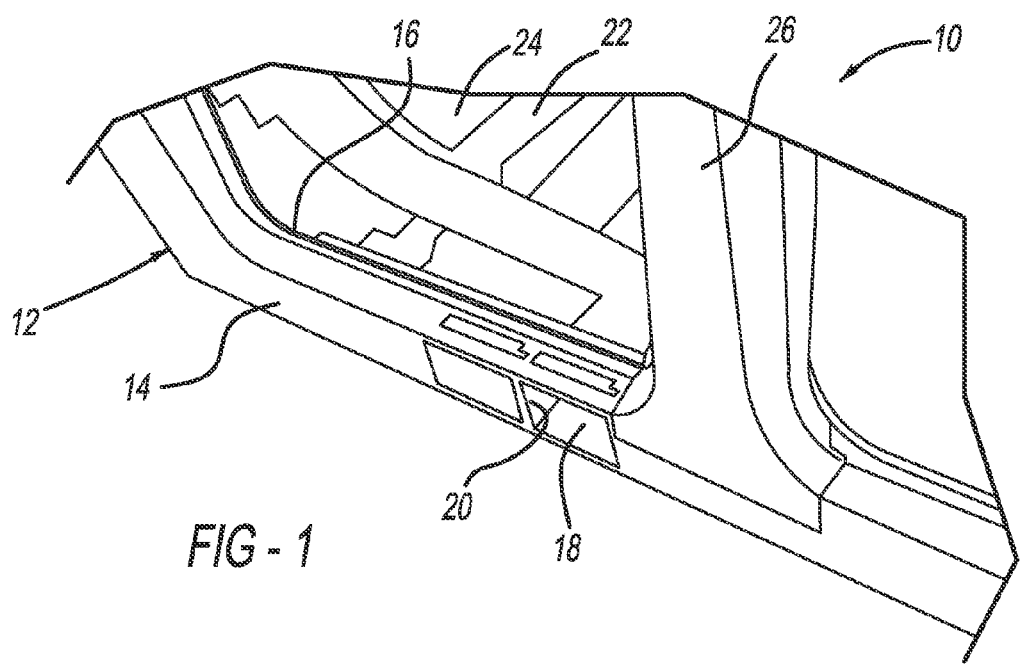
FIG. 1 is a broken-away, isometric view of a portion of a vehicle including a rocker panel.

The following discussion of the embodiments of the invention directed to a rocker panel on a vehicle including a micro-truss core is merely exemplary in nature, and is in no way intended to limit the invention or its applications or uses. For example, although the invention is specifically referred to as part of a rocker panel for a vehicle, those skilled in the art will appreciate that the micro-truss core as part of the invention can be employed in other vehicle beams and structures.

As will be discussed in detail below, the present invention, proposes an automotive structural assembly having a sandwich construction incorporating an architected core material, referred to herein as a micro-truss structure or micro-truss core. The architected core material is composed of a repeating set of ordered three-dimensional polymer waveguides. Although sandwich structures are known in the vehicle impact beam art, what differentiates the present invention from other designs is the use of and formation process for the micro-truss sandwich core. As will be discussed, a sandwich structure with an architected micro-truss core enables impact beam and structural capabilities and performances that were heretofore not possible using known methods.

The micro-truss core material possesses increased stiffness and strength versus alternative stochastic sandwich core materials, such as metal or polymeric foams, given that it enables precise control of the material's spatial arrangement. Higher stiffness and strength in the sandwich core translates into a reduced repair cost in the event of low speed impacts. Micro-truss core materials can be manufactured at much lower costs as compared to other high-strength and high-stiffness core materials, such as metallic or composite honeycombs. Because the micro-truss core can be formed in place and directly bonded onto curved surfaces, fasteners and angled faces, it eliminates the need for costly secondary machining and multi-stage bonding operations associated with honeycomb cores. The micro-truss fabrication process enables functional grading, spatial control of the physical and mechanical properties of the core in all three-dimensions using a single material, something which is not possible with all of the other sandwich core forms that have homogeneous physical and mechanical properties at different locations in the core. In a structural member, functional grading can be used to provide enhanced structural support in localized regions of the member, such as attachment points, the member mid-span or likely impact locations. Polymer micro-truss core materials can be integrated into sandwich designs containing aluminum, steel, or carbon fiber reinforced polymer facesheets, or any combination thereof, without the need for corrosion prevention devices or coatings. This is not the case for core materials such as aluminum honeycombs or foams which require galvanic protection when applied to steels or carbon fiber reinforcement polymers. The use of a sandwich construction, particularly one with a micro-truss core, also opens up the design space for structural members to form geometries that cannot be manufactured using monolithic metal for fiber reinforced polymer composites alone. The sandwich design can circumvent inherent limits for extrusion, pultrusion, stamping, and laminating processes by utilizing simple shapes for the metal or composite facesheet materials to create a complex geometry sandwich.

Within the sandwich construction, the structure of the micro-truss core results in a higher stiffness and strength compared to prior art stochastic core materials. Additionally, the micro-truss architecture allows for the properties of the structural member to be spatially tailored to meet anticipated impact conditions. The ability to functionally grade the performance of the micro-truss core throughout the member ensures the highest level of structural efficiency, i.e., material is only placed where it is required. The method of fabrication presented herein also offers significant improvements over previous sandwich impact beam and structural manufacturing methods. The net shape formation of the micro-truss structure results in a lower-cost structure as compared to an equivalent performance honeycomb core as a result of the labor-intensive machining and multi-stage bonding operations required for incorporation of the honeycomb structure.

Continuous carbon fiber reinforced polymer matrix composites can be used to form the facesheets of the structural member. However, the micro-truss fabrication process described herein is compatible with a variety of different materials including discontinuous carbon fiber composites, continuous or discontinuous glass fiber composites, unreinforced polymers, aluminum alloys, structural steels, or any combination thereof. This means that both facesheets in the structural member may be composed of the same material or they may be composed of dissimilar materials. The latter case is highly beneficial when the critical property determining material selection (e.g. stiffness, mass, cost, formability, etc.) is different for both facesheets. However, if dissimilar materials are used for the facesheets, then the open cross-section design may be required to prevent galvanic corrosion or similar material capability issues between the facesheets themselves and not the core.

The micro-truss core structure in the structural member is composed of an ordered three-dimensional network of self-propagating polymer waveguides grown from a photo-monomer resin using a controlled exposure to collimated UV light sources at specified orientations through a plurality of apertures in a mask. Any UV-curable photo-monomer or blend thereof that displays the self-propagation phenomenon can be used to form the micro-truss or micro-lattice architecture. Alternatively, the micro-truss structure may be formed using the aforementioned photo-polymerization technique and then converted or augmented via electro or electro-less plating, reverse casting, vapor deposition, oxidation, dip coating, sputtering, or other suitable process into a hollow or solid metallic, ceramic, or polymer material different from the initial photopolymer. In certain embodiments of the structural member manufacturing process, the micro-truss core is grown directly on one of the two sandwich facesheets. The second facesheet is then joined to the core using an adhesive material applied to the facesheet and/or the micro-truss. This adhesive may be composed of a single or multi-part paste for a continuous sheet of film. Additional materials, such as glass, scrim or syntactic fillers, may be added to the adhesive to maintain control of the bond line thickness.

FIG. 1 is a broken-away, isometric view of a portion of a vehicle 10 specifically showing a vehicle rocker panel 12 at a side of the vehicle 10 defined by specially configured and formed panels 14 and 16 that are welded together to form a rectangular shaped tube defining a channel 18. In one embodiment, the panels 14 and 16 are steel panels, but can be other materials for other vehicle designs. A reinforcing wall 20, which typically would be one of several reinforcing walls in the rocker panel 12, is shown extending across the channel 18 and provides structural integrity to the rocker panel 12. The portion of the vehicle 10 shown in FIG. 1 also depicts a floor panel 22 in a passenger compartment 24 of the vehicle 10 and a pillar 26 extending vertical from the rocker panel 12 and also being formed by adjoining panels welded together to form a rectangular shaped channel, which reduces the weight of the vehicle 10.

As will be discussed in detail below, the present invention proposes employing a micro-truss structure or core as a local structural reinforcement member in the rocker panel 12 to improve stiffness and energy absorption over known rocker panel designs. As is known, micro-truss structures typically offer better multi-directional load carrying capabilities per unit mass than structural foam materials. More particularly, micro-truss structures have a regular microstructure, as opposed to foams that have a non-regular structure, which makes micro-truss structures more efficient structurally for stiffness and energy absorption. The micro-truss structure and material can be customized to provide a tailored stiffness and/or energy absorption profile for a particular application.

Figure 2:
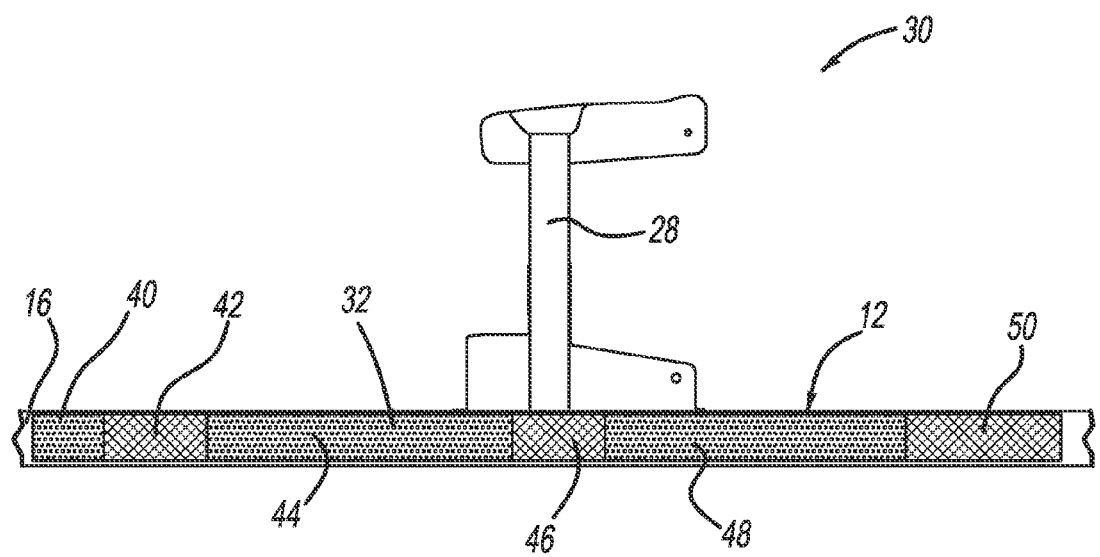
FIG. 2 is an illustration of a portion of the vehicle rocker panel and a cross-car beam showing a micro-truss core within the rocker panel.

FIG. 2 is a top down view of a structural assembly 30 from the vehicle 10 including the rocker panel 12 and a cross-car beam 28, where the front panel 14 of the rocker panel 12 is removed. A micro-truss core 32 is positioned within the rocker panel 12, and extends along its length, where the core 32 replaces the reinforcing walls 20 to provide structural integrity for the rocker panel 12. The micro-truss core 32 is fabricated by any suitable micro-truss structure fabrication technique, such as those referred to above. The micro-truss core 32 includes a plurality of micro-truss sections, specifically, in this non-limiting embodiment, six sections 40, 42, 44, 46, 48 and 50 of varying lengths that are contiguous with each other. In this non-limiting example, the sections 40, 44 and 48 are low-density micro-truss sections providing one level of structural integrity and the sections 42, 46 and 50 are high-density micro-truss sections providing another level of higher structural integrity.

FIG. 3 is a cross-sectional view of the rocker panel 12 through the section 40 and FIG. 4 is a cross-sectional view of the rocker panel 12 through the section 42. The back panel 16 is a continuous formed metal piece including a C-shaped back plate 60 and edge flanges 62 and 64, and the front panel 14 is a continuous formed metal piece including a C-shaped front plate 66 and edge flanges 68 and 70. The flanges 62 and 68 are welded together and the flanges 64 and 70 are welded together to define the channel 18 in which the micro-truss core 32 is positioned.

The density and stiffness of the sections 40-50 is selectively tailored by the micro-truss fabrication process, including selectively determining the number of apertures and the size of the apertures in the mask that forms the core 32. Also, the sections 40-50 each have a length and mass that is selected for the particular location along the rocker panel 12. The higher-density sections 42, 46 and 50 provide increased stiffness and structural integrity and are selectively tailored for location and length in the rocker panel 12, where that increased structural integrity may be desired. For example, the high-density section 46 is positioned adjacent to the cross-car beam 28, and other high-density sections can be positioned adjacent to cross-car members where increased structural integrity may be required. The lower-density sections 40, 44 and 48 are also selectively tailored in location and length for those locations along the rocker panel 12 where less structural integrity is required, which reduces vehicle weight.

The sections 40-50 can be provided and positioned within the channel 18 of the rocker panel 12 in any suitable manner. For example, the sections 40-50 can be a continuous length of a micro-truss structure that is fabricated at the same time, where transitions between the different sections are formed at the time the core 32 is fabricated by selectively providing the number and size of the apertures. Alternately, each separate section 40-50 can be independently fabricated by a suitable micro-truss fabrication process and then simply laid in or positioned within the channel 18 in relationship to each other, where the sections 40-50 would be laid in one of the panels 14 or 16 prior to the panels 14 and 16 being welded together. In addition, the front panel 14 or the back panel 16 can be the sheet that the micro-truss structure is formed on during the fabrication process, where the micro-truss material can be cured in place with a pattern tailored to match crash and stiffness loads as they vary along the length of the rocker panel 12.

Figure 5:
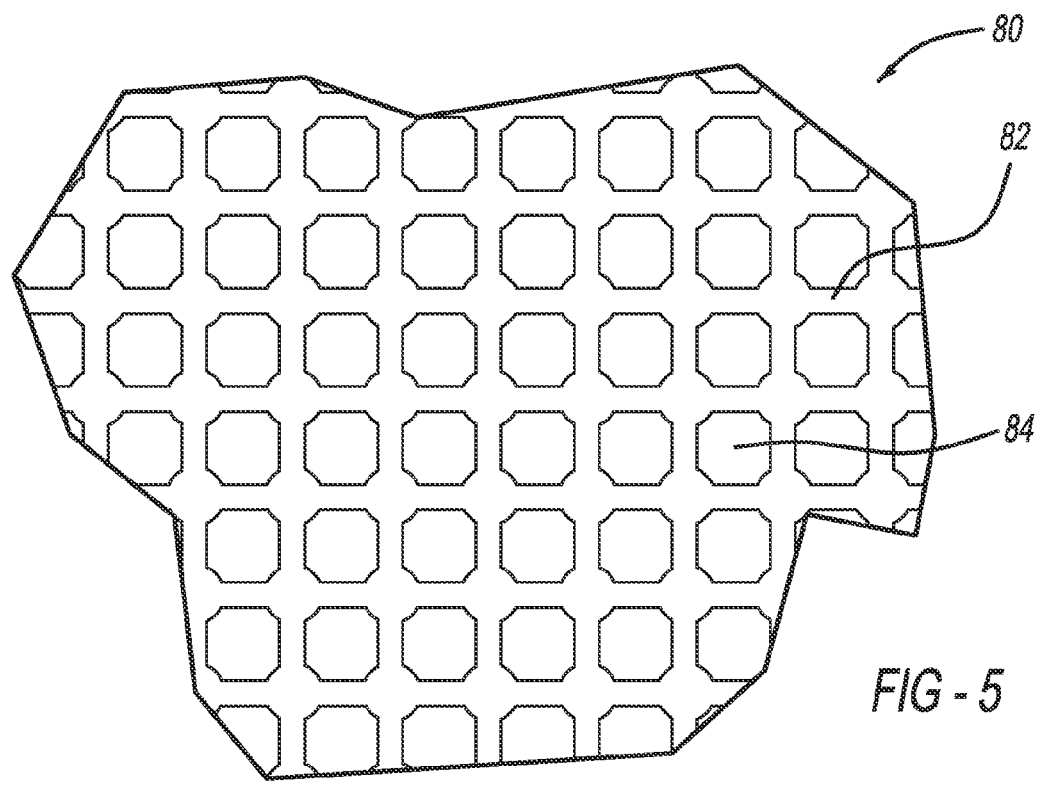
FIG. 5 is a top view of a micro-truss core having one structural density.
Figure 6:
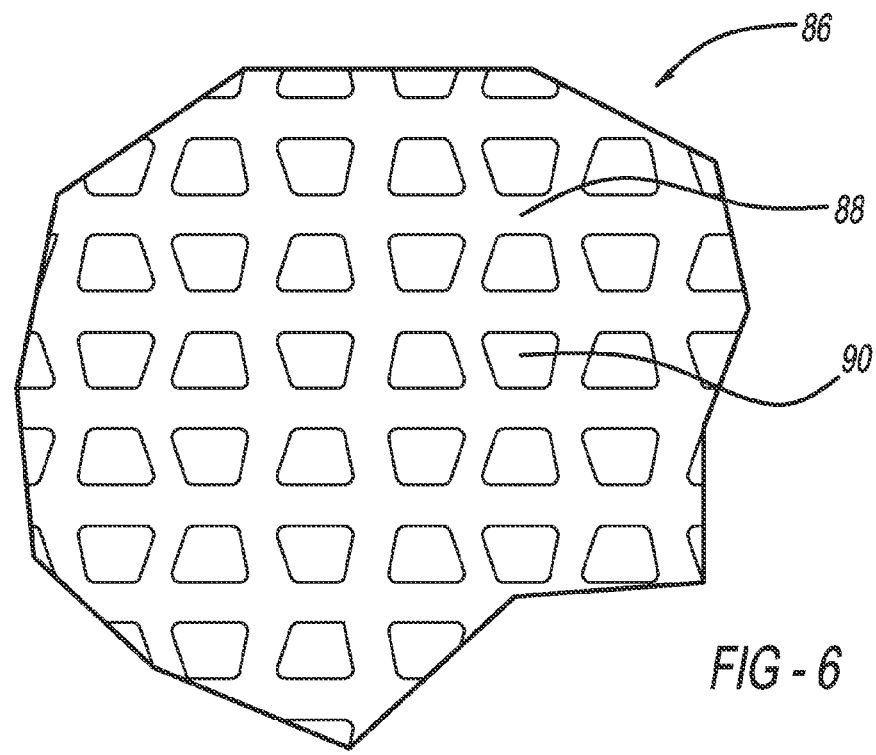
FIG. 6 is a top view of another micro-truss core having another structural density.

As discussed above, the thermoset material, the thickness of the struts, the size of the sections 40-50, etc. of the micro-truss core 12 can be selectively provided for the integrity desired for a particular application along the length of the rocker panel 12. To illustrate this, FIG. 5 is a top view of a low-density micro-truss structure 80 including relatively thin struts 82 defining open areas 84 therebetween, and FIG. 6 is a top view of a high-density micro-truss structure 86 having relatively thick struts 88 defining open areas 90 therebetween.

The foregoing discussion disclosed and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A vehicle structural member comprising:
   a back panel;
   a front panel secured to the back panel and defining a channel therebetween extending along the length of the member; and
   a micro-truss structure positioned within the channel, said micro-truss structure including a plurality of micro-truss sections where at least two of the sections have different micro-truss structural densities providing different structural integrity, where the micro-truss structure is fabricated on one of the panels, with the plurality of micro-truss sections cured in place, before the front panel is secured to the back panel.

2. The structural member according to claim 1 wherein the plurality of micro-truss sections are contiguous sections.

3. The structural member according to claim 2 wherein the plurality of micro-truss sections are separate sections positioned adjacent to each other.

4. The structural member according to claim 2 wherein the plurality of micro-truss sections are fabricated together as a single micro-truss structure.

5. The structural member according to claim 2 wherein the plurality of micro-truss sections include low-density and high-density sections.

6. The structural member according to claim 5 wherein the plurality of micro-truss sections are configured as alternating low-density and high-density sections.

7. The structural member according to claim 5 wherein the high-density sections are positioned adjacent to vehicle structural beams.

8. The structural member according to claim 7 wherein the structural beams includes pillars and cross-car members.

9. The structural member according to claim 1 wherein the front and back panels include flanges that are welded together.

10. The structural member according to claim 1 wherein the front and back panels are steel panels.

11. The structural member according to claim 1 wherein the structural member is a vehicle rocker panel.

12. A vehicle rocker panel comprising:
a back panel;
a front panel secured to the back panel and defining a channel therebetween extending along the length of the rocker panel; and
a micro-truss structure positioned within the channel, said micro-truss structure including a plurality of contiguous low-density and high-density micro-truss sections providing different structural integrity, where the micro-truss structure is fabricated on one of the panels, with the plurality of micro-truss sections cured in place, before the front panel is secured to the back panel.

13. The rocker panel according to claim 12 wherein the plurality of micro-truss sections are separate sections positioned adjacent to each other.

14. The rocker panel according to claim 12 wherein the plurality of micro-truss sections are fabricated together as a single micro-truss structure.

15. The rocker panel according to claim 12 wherein the plurality of micro-truss sections are configured as alternating low-density and high-density sections.

16. A vehicle structural member comprising:
a back panel;
a front panel secured to the back panel and defining a channel therebetween extending along the length of the member; and
a micro-truss structure positioned within the channel, wherein the micro-truss structure includes a plurality of contiguous, alternating low-density and high-density micro-truss sections, and the high-density sections are positioned adjacent to vehicle structural beams which intersect with the vehicle structural member.

* * * * *